United States Patent

Munekata et al.

[11] Patent Number: 5,946,969
[45] Date of Patent: Sep. 7, 1999

[54] LEVER DISPLACEMENT ENLARGING MECHANISM

[75] Inventors: Mutsuo Munekata; Susumu Matsuno; Shoichi Ono; Koji Kawasaki, all of Sakura; Kokichi Uzawa, Tokyo; Hiroshi Kinugawa, Nagareyama, all of Japan

[73] Assignee: Chichibu Onoda Cement Corporation, Minato-ku, Tokyo, Japan

[21] Appl. No.: 09/068,991

[22] PCT Filed: Sep. 27, 1996

[86] PCT No.: PCT/JP96/02823

§ 371 Date: May 26, 1998

§ 102(e) Date: May 26, 1998

[87] PCT Pub. No.: WO98/13928

PCT Pub. Date: Apr. 2, 1998

[51] Int. Cl.⁶ ............................... F16H 21/44
[52] U.S. Cl. .................. 74/110; 310/328; 251/129.06
[58] Field of Search ............... 74/110, 519; 310/328; 251/129.06

[56] References Cited

U.S. PATENT DOCUMENTS

| | | | |
|---|---|---|---|
| 4,783,610 | 11/1988 | Asano | 310/328 |
| 5,287,761 | 2/1994 | Fujii et al. | 74/110 |
| 5,410,206 | 4/1995 | Luecke et al. | 310/328 |
| 5,410,207 | 4/1995 | Miura et al. | 310/328 |
| 5,802,914 | 9/1998 | Fassler et al. | 74/110 |
| 5,810,325 | 9/1998 | Carr | 251/129.06 |
| 5,834,879 | 11/1998 | Watanabe et al. | 310/328 |

*Primary Examiner*—John A. Jeffery
*Assistant Examiner*—Chong H. Kim
*Attorney, Agent, or Firm*—Armstrong, Westerman, Hattori, McLeland & Naughton

[57] ABSTRACT

The invention provides a lever displacement enlarging mechanism which is applicable for a positioning apparatus of an optical stage, is provided with bisymmetrical levers enlarging and transmitting a displacing force of an actuator element, and in which the distance between the leading end sides of boundary grooves and outer edges of coupling posts is smaller than that between the trailing end sides thereof and the outer edges and action point hinges are located closer to the axis of symmetry so that the fulcrum hinges and the force point hinges are closer to the outer edges of the coupling posts.

19 Claims, 11 Drawing Sheets

LEVER DISPLACEMENT ENLARGING MECHANISM

TECHNICAL FIELD

The present invention relates to a lever displacement enlarging mechanism applicable in an optical stage positioning apparatus, a micro-flow rate control valve (mass flow controller) and so on. More particularly, the present invention relates to a lever displacement enlarging mechanism which is applicable to an apparatus in which it is difficult to provide enough space for housing a displacement enlarging mechanism from design considerations, and is still required to give a prescribed enlarging ratio of displacement, or of which straight forwarding property or straightforward displacement of the output displacement section is required.

BACKGROUND ART

In a conventional micro-flow rate control valve, it has been a common practice to generate a micron-order displacement by piling up a number of piezo-electric elements. These many piled-up piezo-electric elements are housed in a small space, for example, of 20 mm×50 mm×50 mm.

However, because the piezo-electric element is expensive in cost, this conventional practice poses economic problems.

It is therefore conceivable to use a lever displacement enlarging mechanism based on a single piezo-electric element (see Japanese Provisional Patent Publication No. H4-218,981).

Conventional cases have however the following problems:

(1) In the design of this displacement enlarging mechanism, components must be housed in a limited space as described above. However, a size capable of being housed in this limited space makes it impossible to achieve a desired ratio of enlargement particularly because of a limited lever ratio. Increasing a size of a lever is naturally conceivable, but an increased lever ratio leads to a larger shape, resulting in a larger-sized apparatus as a whole, and also in a lower transmitting efficiency of the amount of displacement and of the generated force to the output end.

(2) As it is the usual practice to apply a preliminary pressure by directly pressing the piezo-electric elements by means of bolts, the piezo-electric elements may sometimes be broken.

(3) Since the lever of the lever displacement enlarging mechanism is not provided bisymmetrically, a rotating component is added to a displacement. So, the enlarged amount of displacement of the piezo-electric elements cannot be transmitted as it is.

(4) Because the force point, the fulcrum and the action point are not arranged on a straight line, the direction of displacement would contain a rotating component, this resulting in displacement of the output displacement section of the mechanism while curving. It is therefore difficult to keep straight forwarding property, and furthermore transmission efficiency of the amount of displacement and the generating force decreases.

In view of the circumstances described above, the present invention has an object to provide a large displacement enlarging ratio while achieving downsizing of the apparatus.

Another object of the invention is to realize prevention of breakage of an actuator element, and easy adjustment of the preliminary pressure.

A further object of the invention is to ensure straight forwarding property of the output displacement section.

SUMMARY OF THE INVENTION

The lever displacement enlarging mechanism of the invention comprises a fixed portion and a movable portion holding both ends of an actuator element in between in a direction of displacement; bisymmetrical coupling posts connectively disposed on both sides of the fixed portion, and having respectively a leading end part thereof facing the movable portion via a boundary groove; bisymmetrical fulcrum hinges respectively connecting a leading end of the respective coupling posts and a lever; bisymmetrical force point hinges respectively connecting a leading end of the movable portion and the lever; and bisymmetrical action point hinges respectively connecting the lever and an output displacement section; wherein the distance between a leading end side of the boundary groove and an outer edge of the coupling post is made smaller than the distance between the trailing end side thereof and the outer edge so that the fulcrum hinge and the force point hinge are closer to the outer edge of the coupling post; and the action point hinge is located at a position closer to an axis of symmetry. It is thus possible to achieve downsizing of the apparatus and improve the displacement enlarging ratio.

The lever displacement enlarging mechanism of the invention comprises a fixed portion and a movable portion holding both ends of an actuator element in between in a direction of displacement; bisymmetrical coupling posts connectively disposed on both ends of the fixed portion, and having respectively a leading end part thereof facing the movable portion via a boundary groove; bisymmetrical fulcrum hinges connecting respectively a leading end of the coupling post and a lever; bisymmetrical force point hinges connecting respectively a leading end of the movable portion and the lever; and bisymmetrical action point hinges connecting respectively the lever and an output displacement section; wherein the distance between a leading end side of the boundary groove and an outer edge of the coupling post is made smaller than the distance between a trailing end side thereof and the outer edge so that the fulcrum hinge and the force point hinge are closer to the outer edge of the coupling post; and the action point is located at a position closer to an axis of symmetry, and wherein a wedge for adjusting a preliminary pressure is provided between the fixed portion and the actuator element. It is therefore possible to downsize the apparatus, improve the displacement enlarging ratio, and prevent breakage of the actuator element.

The lever displacement enlarging mechanism of the invention comprises an upper fixed portion and a push plate holding both ends of an actuator element in between in a direction of displacement; bisymmetrical first force point hinges connecting the push plate and first levers; bisymmetrical first fulcrum hinges connecting the first levers and a lower fixed portion; bisymmetrical coupling posts connectively disposed on both sides of the first levers via first action point hinges, and having leading ends facing the upper fixed portion via boundary grooves; bisymmetrical second force point hinges connecting leading ends of the coupling posts and second levers; bisymmetrical second fulcrum hinges connecting leading ends of the upper fixed portion and the second levers; and bisymmetrical second action point hinges connecting the second levers and an output displacement section; wherein action points, force points and fulcrums of the first levers are positioned on a straight line; and the distance between leading end sides of the boundary grooves and outer edges of the coupling posts is made smaller than the distance between trailing end sides thereof and the outer edges so that the second fulcrum hinges and the second force point hinges are closer to the outer edges of the coupling posts, and the second action point hinges are located at positions closer to an axis of symmetry; and wherein a wedge for adjusting a preliminary pressure is provided between the fixed portion and the actuator element. It is thus possible to downsize the apparatus, improve the displacement enlarging ratio, and prevent breakage of the actuator element.

The lever displacement enlarging mechanism of the invention comprises a fixed portion and a movable portion holding both ends of an actuator element in between in a direction of displacement; bisymmetrical coupling posts connectively disposed on both sides of the fixed portion, and having respectively a leading end part thereof facing the movable portion via a boundary groove; bisymmetrical fulcrum hinges connecting respectively a leading end of the coupling post and a lever; bisymmetrical force point hinges connecting respectively a leading end of the movable portion and the lever; and bisymmetrical action point hinges connecting respectively the lever and an output displacement section. There is provided straight forward correcting means for imparting a displacement direction correcting force to the hinges of the levers. It is therefore possible to ensure the straight forwarding property of the output displacement section.

DESCRIPTION OF THE PREFERRED EMBODIMENTS

Figure 1:
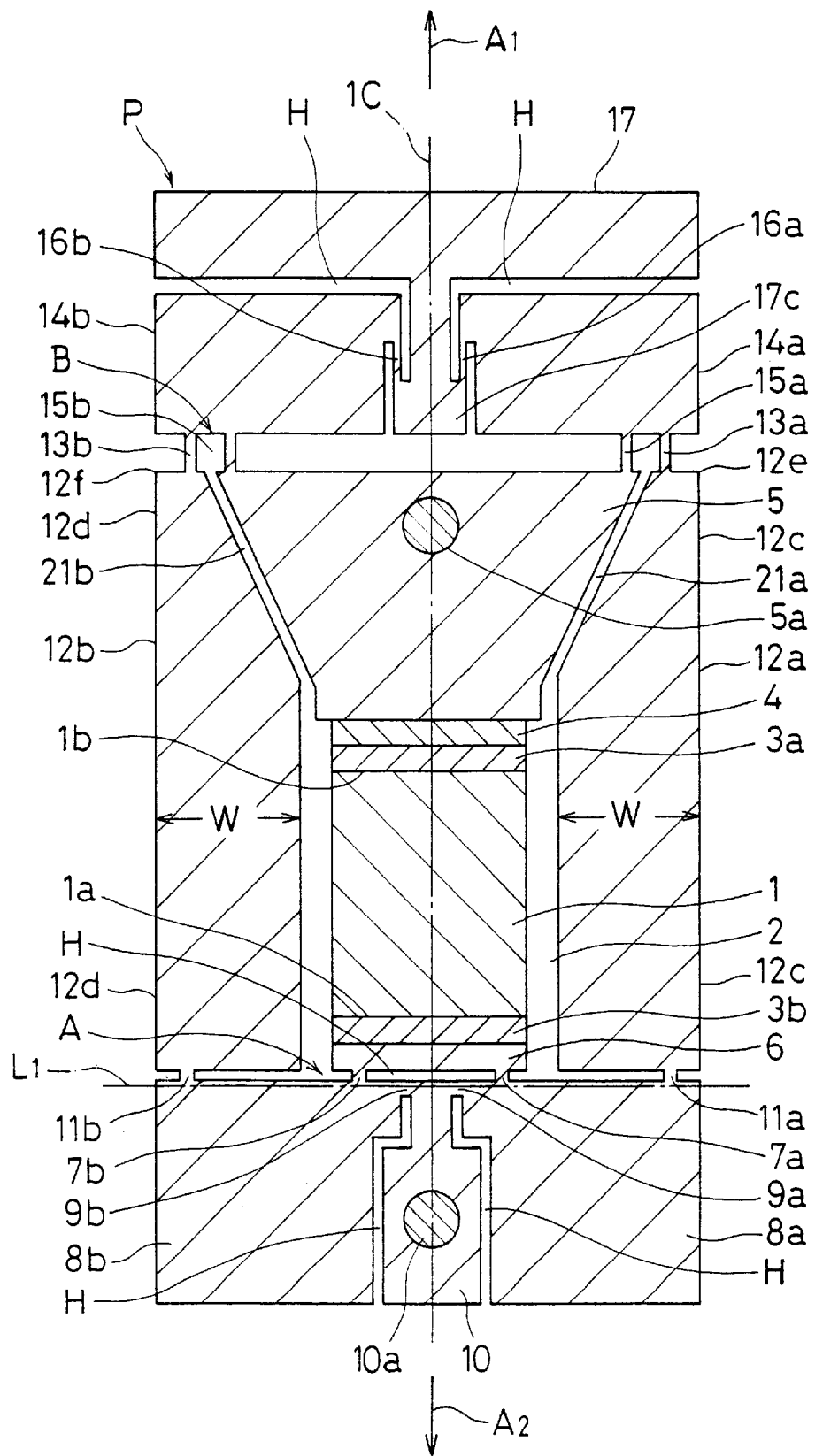
FIG. 1 is a longitudinal sectional view illustrating a first embodiment of the present invention.

An embodiment of the invention will now be described with reference to FIGS. 1 and 2. This embodiment covers a two-stage lever displacement enlarging mechanism provided with a first and a second lever displacement mechanisms A and B.

A cut groove H is formed through electric discharge fabrication, laser fabrication, etc. of a rectangular plate such as a stainless steel plate P, and there are formed a housing portion 2, an upper fixed portion 5, bisymmetrical first levers 8a and 8b, a lower fixed portion 10, bisymmetrical coupling posts 12a and 12b, bisymmetrical second levers 14a and 14b, and an output displacement section 17.

In the housing portion 2, an actuator element 1 is arranged, and a lower end 1a thereof is pressed into contact with a push plate 6 via a lower protecting plate 3b. The actuator element 1 is an upright actuator element displacing in the direction of an axis of symmetry 1C of the plate P, such as a piezo-electric, electrostrictive, or magnetostrictive element.

A push plate 6 is connected to the bisymmetrical first levers 8a and 8b via force point hinges 7a and 7b of the first lever displacement enlarging mechanism A arranged bisymmetrically.

The first levers 8a and 8b are connected to lower ends of the bisymmetrically arranged coupling posts 12a and 12b via bisymmetrical action point hinges 11a and 11b. These action point hinges 11a and 11b are located at positions closer to outer edges 12c and 12d of the coupling posts 12a and 12b.

The first levers 8a and 8b are connected to the lower fixed portion 10 via bisymmetrical fulcrum hinges 9a and 9b. These fulcrum hinges 9a and 9b are located closer to an axis of symmetry 1C, and connected sideways to the lower fixed portion 10, effectuating a small distance between fulcrums and force points. As a result, it is possible to increase the lever ratio of the first levers 8a and 8b and downsize the apparatus as a whole. Because the fulcrums, the force points and the action points of the first levers 8a and 8b are on a straight line L1, the direction of displacement is along the direction of the axis of symmetry 1C, producing almost no rotation component.

A top end 1b of the aforesaid actuator element 1 is pressure-connected to the upper fixed portion 5 via an upper protecting plate 3a and a wedge plate 4. The wedge plate 4 imparts a preliminary pressure to a piezo-electric element and prevents a damage to the piezo-electric element upon imparting the preliminary pressure. An appropriate preliminary pressure is imparted by adjusting the thickness and the amount of pressing of the wedge plate 4.

The upper fixed portion 5 is formed into an inverted trapezoid, and has bisymmetrical upper fulcrum hinges 15a and 15b at top corners thereof. The upper fulcrum hinges 15a and 15b are connected to second levers 14a and 14b of a second lever displacement enlarging mechanism B, arranged bisymmetrically. The second levers 14a and 14b are bisymmetrically arranged and are connected to a central projection 17c of the output displacement section 17 via bisymmetrical action point hinges 16a and 16b.

The output displacement section 17 is connected to a valve rod or the like of a micro-fow rate control valve not shown.

The second levers 14a and 14b are connected to top ends of the coupling posts 12a and 12b via second force point hinges 13a and 13b. Top end parts 12e and 12f of the coupling posts 12a and 12b face the upper fixed portion 5 via boundary grooves 21a and 21b. The top end parts 12e and 12f are tapering to the ends, and the boundary grooves 21a and 21b incline diagonally upward to outside.

This geometry of the boundary grooves 21a and 21b gives the following advantages:

(1) The distance between the second force point hinges 13a and 13b, on the one hand, and the second fulcrum hinges 15a and 15b, on the other hand, can be reduced, thus achieving increasing the lever ratio of the second levers 14a and 14b.

(2) Elongation caused by deformation of the coupling posts 21a and 12b can be reduced.

(3) The second force point hinges 13a and 13b and the second fulcrum hinges 15a and 15b are positioned closer to the outer edges 12c and 12d of the coupling posts 12a and 12b, and largely apart from the action point hinges 16a and 16b in the proximity of the axis of symmetry 1C, so that the lever ratio can be improved.

Figure 2:
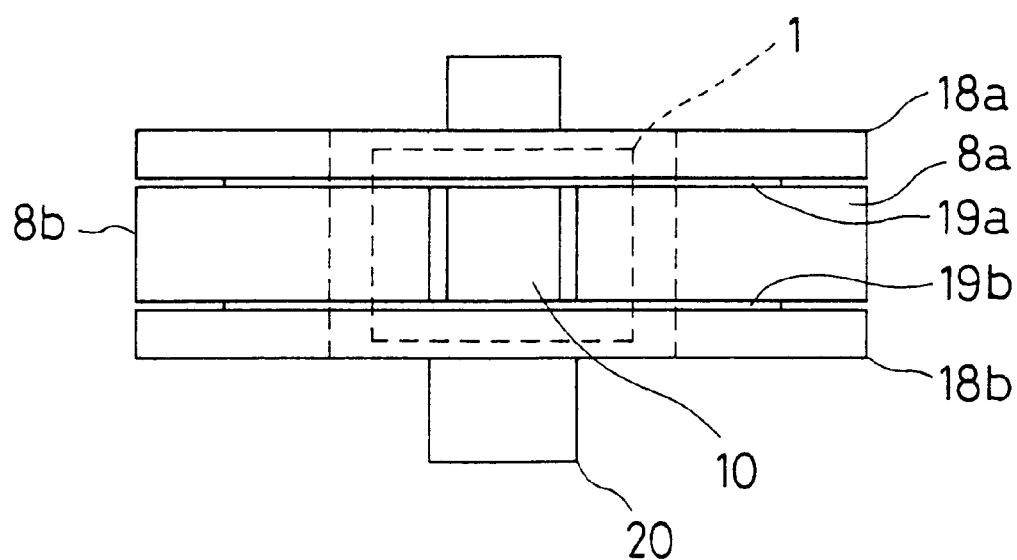
FIG. 2 is a front view illustrating the first embodiment of the invention.

Because the lower fixed portion 10 is separated from the upper fixed portion 5, coupling plates 18a and 18b are arranged on the surface side and the back side of the foregoing plate P, as shown in FIG. 2, and a fixing bolt and nut 20 is inserted into an upper fixing hole 5a and a lower fixing hole 10a to tighten for integration of these components.

To avoid contact with a movable component such as a lever to be displaced by the actuator element 1, the coupling plates 18a and 18b are tightened by holding spacers 19a and 19b identical with the contours of the upper fixed portion 5 and the lower fixed portion 10 in between.

Now, operations of this embodiment of the invention will be described below. When applying a voltage to the actuator element such as a piezo-electric element 1, the piezo-electric element 1 elongates in the direction of the axis of symmetry 1C in response to the applied voltage, and moves the push plate 6 in the arrow A2 direction against the preliminary pressure.

When the push plate 6 moves in the arrow A2 direction, a force acts in the arrow A2 direction on the first levers 8a and 8b via the force point hinges 7a and 7b of the first lever displacement enlarging mechanism A. As a result, the levers 8a and 8b cause the coupling posts 12a and 12b to move in the arrow A2 direction via the action point hinges 11a and 11b.

Since the second force point hinges 13a and 13b of the second levers 14a and 14b are pulled in the arrow A2 direction by the displacement of the coupling posts 12a and 12b, the output displacement section 17 moves in the arrow A1 direction via the second action point hinges 16a and 16b.

The amount of displacement of the piezo-electric element 1 is largely enlarged by the law of lever and transmitted to the output displacement section 17. Because the lever displacement enlarging mechanisms A and B are bisymmetrically arranged, the displacement is free from a rotating component, having only a component in the direction of the axis of symmetry 1C.

The second action point hinges 16a and 16b and the second force point hinges 13a and 13b of the second lever displacement enlarging mechanism B move in accordance with the law of lever, the former and the latter moving in a counter direction with each other. It is therefore available to largely enlarge the amount of displacement.

When the applied voltage is brought to null, the apparatus is reset to zero by the restoring force of the fulcrum, force point and action point hinges of the first levers 8a and 8b and the second levers 14a and 14b. Opening of the valve is adjusted by driving the output displacement section 17 while repeating a change in voltage.

As is evident from the above description, the lever displacement enlarging mechanism of the invention provides the following remarkable advantages:

(1) Because the lever displacement enlarging mechanisms are bisymmetrically arranged, the displacement is free from a rotation component, consisting only of the component in the direction of the axis of symmetry, so that the enlarged amount of displacement of the piezo-electric element can be transmitted correctly.

(2) The distance between the leading end sides of the boundary grooves and the outer edges of the coupling posts is made smaller than the distance between the trailing end sides thereof and the outer edges so that the fulcrum hinges and the force point hinges are closer to the outer edges of the coupling posts, and the action point hinges are arranged closer to the axis of symmetry. A lever ratio larger than that available in the conventional art can therefore be obtained. A compact apparatus giving a large amount of enlarged displacement is thus available.

(3) By using the coupling posts, the fulcrums, the force points and the action points can be arranged on a straight line. A rotating component is consequently eliminated in the direction of displacement, and displacement component becomes a straight forwarding displacement.

(4) The wedge provided permits imparting a preliminary pressure to the actuator element and preventing breakage. Because of the nature of a wedge, it is possible to easily impart a desired preliminary pressure to that element by adjusting the thickness and the extent of hammering.

Figure 3:
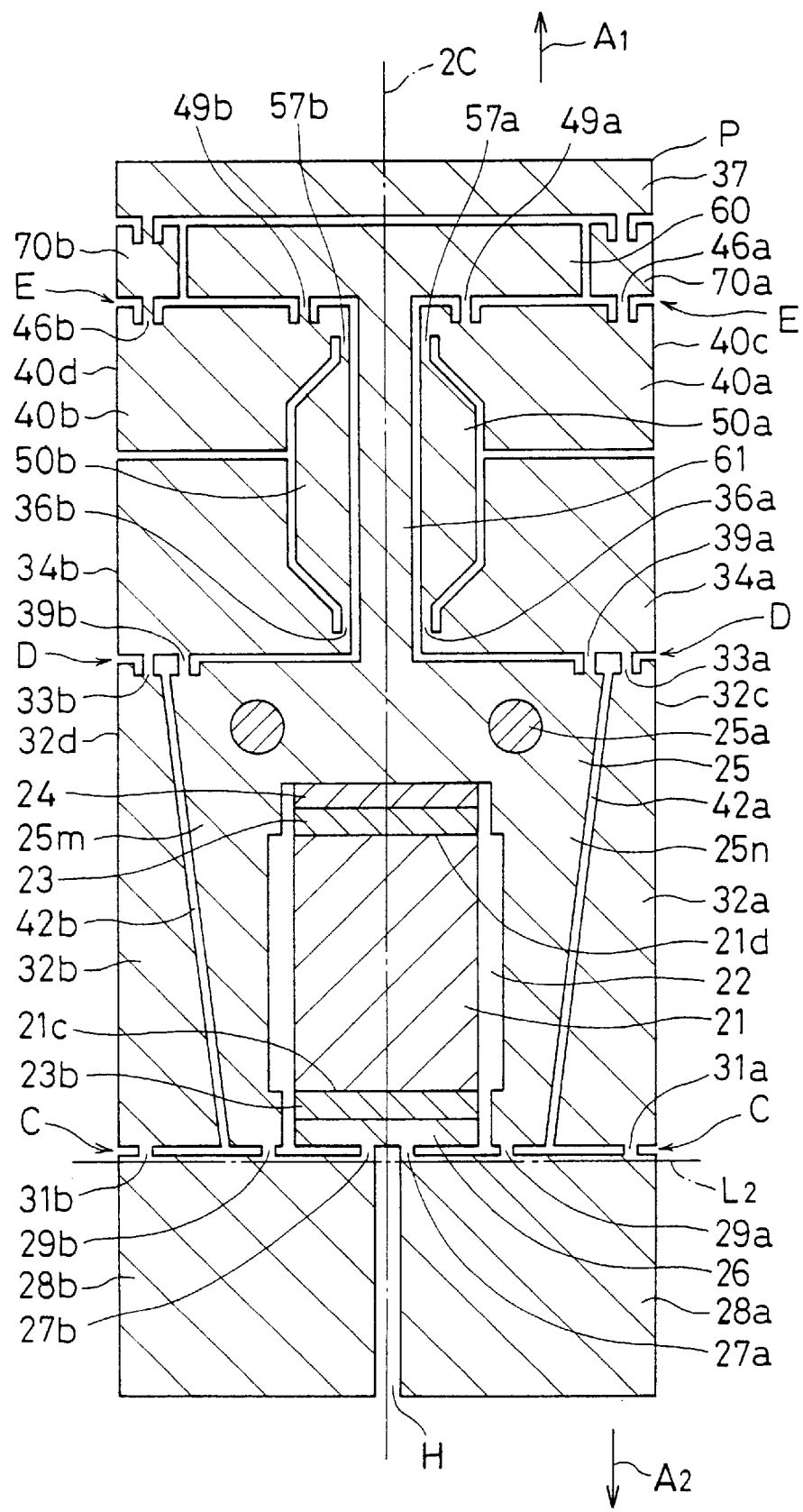
FIG. 3 is a longitudinal sectional view illustrating a second embodiment of the invention, corresponding to FIG. 1.

A second embodiment of the invention will now be described below with reference to FIG. 3. This embodiment covers a three-stage lever displacement enlarging mechanism provided with a first, a second and a third lever displacement enlarging mechanisms C, D and E.

A plate such as a stainless steel plate P is provided with a cut groove H formed through discharge fabrication, laser fabrication, etc., and there are formed a housing portion 22, a fixed portion 25, bisymmetrical first levers 28a and 28b, coupling posts 32a and 32b, second levers 34a and 34b, third levers 40a and 40b, tops 50a and 50b, a block 60, coupling tops 70a and 70b, and an output displacement section 37.

An actuator element 21 is arranged in the housing portion 22, and a lower end 21c thereof is pressure-connected to a push plate 26 via a lower protecting plate 23b. The actuator element 21 is an upright actuator element displacing in the direction of the axis of symmetry 2C of the plate P, such as a piezo-electric, electrostrictive or magnetostrictive element.

The push plate 26 is connected to the bisymmetrical first levers 28a and 28b via first force point hinges 27a and 27b of a first lever displacement enlarging mechanism C.

The first levers 28a and 28b are connected to lower ends of coupling posts 32a and 32b arranged bisymmetrically via bisymmetrical action point hinges 31a and 31b.

The first levers 28a and 28b are connected to side posts 25n and 25m of the fixed portion via bisymmetrical fulcrum hinges 29a and 29b. As the fulcrums, the force points and the action points of the first levers 28a and 28b are located on a straight line L2, the direction of displacement is in the direction of the axis of symmetry 2C, and there is produced almost no rotating component.

The top end 21d of the actuator element 21 is pressure-connected to the fixed portion 25 via an upper protecting plate 23a and a wedge plate 24. The wedge plate 24 imparts a preliminary pressure to the piezo-electric element, and prevents a damage to the piezo-electric element. An appropriate preliminary pressure can be imparted to the piezo-electric element by adjusting the thickness and the amount of pressing the wedge plate 24.

The fixed plate 25 is fixed by a fixing screw 25a, and bisymmetrical second fulcrum hinges 39a and 39b are provided at top corners thereof. The second fulcrum hinges 39a and 39b are connected to second levers 34a and 34b of the second lever displacement enlarging mechanism D arranged bisymmetrically.

The second levers 34a and 34b are bisymmetrically arranged, and connected to bisymmetrical tops 50a and 50b via bisymmetrical second action point hinges 36a and 36b. The tops 50a and 50b are formed into trapezoids.

The second levers 34a and 34b are connected to top ends of the coupling posts 32a and 32b via second force point hinges 33a and 33b. The coupling posts 32a and 32b face side posts 25n and 25m of the fixed portion 25 via boundary grooves 42a and 42b. The coupling posts 32a and 32b are convergent toward the tips, i.e., tapered. As a result, the boundary grooves 42a and 42b between the fixed portion 25 and the coupling posts 32a and 32b diagonally incline upward to outside.

When the boundary grooves 42a and 42b are formed as described above, the following advantages are available:

(1) The distance between the second force point hinges 33a and 33b, on the one hand, on the second fulcrum hinges 39a and 39b, on the other hand, can be reduced, thus achieving increasing the lever ratio of the second levers 34a and 34b.

(2) Elongation caused by deformation of the coupling posts 32a and 32b can be reduced.

(3) The second force point hinges 33a and 33b and the second fulcrum hinges 39a and 39b are positioned closer to outer edges 32c and 32d of the coupling posts 32a and 32b, and largely apart from the action point hinges 36a and 36b in the proximity of the axis of symmetry C2, so that the lever ratio can be improved.

The bisymmetrical second levers 34a and 34b are connected to the third levers 40a and 40b via the bisymmetrical tops 50a and 50b. The tops 50a and 50b are formed into trapezoid, have ends on one side connected to the second levers 34a and 34b via the bisymmetrical second action point hinges 36a and 36b, and the other ends connected to the third levers 40a and 40b of the third lever displacement enlarging mechanism E via bisymmetrical third force point hinges 57a and 57b.

In the third lever displacement enlarging mechanism E, the force points and the fulcrums are closer to each other and located closer to the axis of symmetry 2C, and the action points are located on the side of outer edges 40c and 40d of the third levers, thus achieving increasing the lever ratio. The third levers 40a and 40b are connected to a block 60 via bisymmetrical third fulcrum hinges 49a and 49b connected to the fixed portion 25 via a fulcrum 61.

The third levers 40a and 40b are connected to ends on one side of bisymmetrical coupling tops 70a and 70b via bisymmetrical third action point hinges 46a and 46b. The other ends of the tops 70a and 70b are connected to an output displacement section 37 which is in turn connected to a valve rod or the like of the micro-flow rate control valve not shown.

Now, operations of this embodiment of the invention will be described below. When applying a voltage to the actuator element such as a piezo-electric element 21, the piezo-electric element 21 elongates in the direction of the axis of symmetry 2C in response to the applied voltage, and moves the push plate 26 in the arrow A2 direction against the preliminary pressure.

When the push plate 26 moves in the arrow A2 direction, a force acts in the arrow A2 direction on the first levers 28a and 28b via the force point hinges 27a and 27b of the first lever displacement enlarging mechanism C. As a result, the levers 28a and 28b cause the coupling posts 32a and 32b to move in the arrow 1 direction via the action point hinges 31a and 31b.

Since the second force point hinges 33a and 33b of the second levers 34a and 34b are pushed in the arrow A1 direction by the displacement of the coupling posts 32a and 32b, the action point hinges 36a and 36b of the second levers 34a and 34b move in the arrow A2 direction. As a result, the tops 50a and 50b are caused to move in the arrow A2 direction. At this point, the force points and the fulcrums of the second lever displacement enlarging mechanism D are close to each other and located on the side of the outer edges 32c and 32d of the coupling posts 32a and 32b, and the action points are located closer to the axis of symmetry 2C. All these points are bisymmetrical, resulting in a larger lever ratio and also a large amount of displacement in the direction of the axis of symmetry 2C, i.e., the arrow A1 direction.

Presence of the tops 50a and 50b leads to a smaller resistance of the hinges, and hence to a higher transmitting efficiency.

Since the third force point hinges 57a and 57b of the third levers 40a and 40b are pulled in the arrow A2 direction by the displacement of the tops 50a and 50b in the arrow A2 direction, the third action point hinges 46a and 46b of the third lever displacement enlarging mechanism E cause the output displacement section 37 to move in the arrow A1 direction via the coupling tops 70a and 70b. The coupling tops 70a and 70b serve to reduce resistance of the hinges and improve the transmitting efficiency.

The amount of displacement of the piezo-electric element 21 is largely enlarged by the law of lever and transmitted to the output displacement section 37. Because the lever displacement enlarging mechanisms C, D and E are bisymmetrically arranged respectively, the displacement is free from a rotating component, having only a component in the direction of the axis of symmetry 2C.

When the applied voltage is brought to null, the apparatus is reset to zero by the restoring force of the fulcrums, the force points and the action points of the first levers 28a and 28b, the second levers 34a and 34b, and the third levers 40a and 40b. Opening of the valve is adjusted by driving the output displacement section 37 while repeating a change in voltage.

Figure 4:
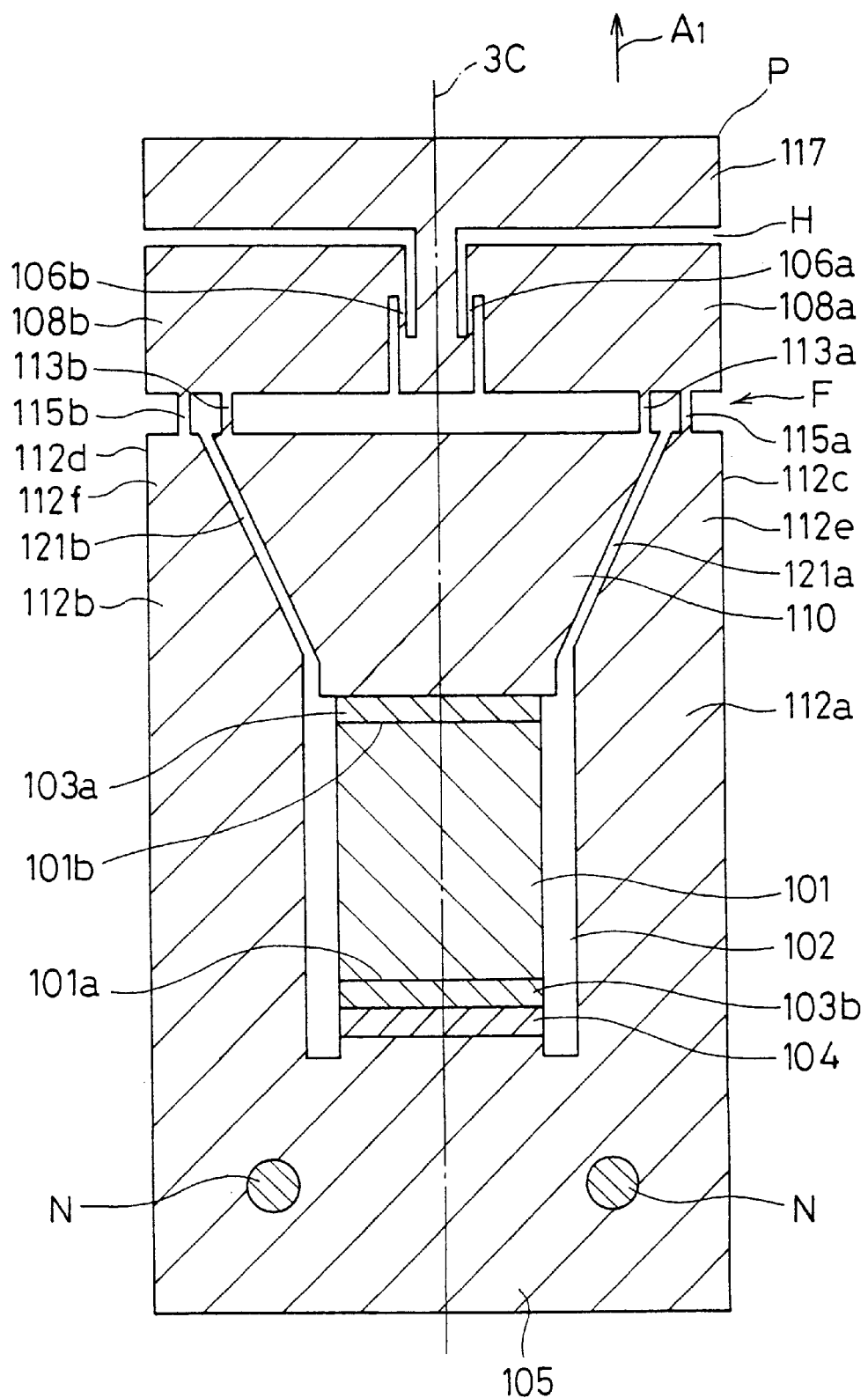
FIG. 4 is a longitudinal sectional view illustrating a third embodiment of the invention, corresponding to FIG. 1.

A third embodiment of the invention will now be described below with reference to FIG. 4. This embodiment relates to a one-stage lever displacement enlarging mechanism having a lever displacement enlarging mechanism F.

A plate such as a stainless steel plate P is provided with a cut groove H formed through discharge fabrication, laser fabrication, or the like, and there are formed a housing portion 102, a fixed portion 105 fixed with a screw N, bisymmetrical levers 108a and 108b, a movable portion 110, bisymmetrical coupling posts 112a and 112b, and an output displacement section 117.

An actuator element 101 is arranged in the housing portion 102, and a lower end 101a thereof is pressure-connected to the fixed portion 105 via a lower protecting plate 103b, and a wedge plate 104.

The actuator element 101 is an upright actuator element displacing in the direction of the axis of symmetry 3C of the plate P, such as a piezo-electric, electrostrictive or magnetostrictive element.

The wedge plate 104 imparts a preliminary pressure to the piezo-electric element and prevents a damage to the piezo-electric element. An appropriate preliminary pressure can be imparted to the piezo-electric element by adjusting the thickness and the amount of pressing of the wedge plate 104.

A top end 101b of the actuator element 101 is pressure-connected to the movable portion 110 via an upper protecting plate 103a.

The movable portion 110 is formed into an inverted trapezoid, and has bisymmetrical force point hinges 113a and 113b formed at top corners thereof. The force point hinges 113a and 113b are connected to bisymmetrically arranged levers 108a and 108b of the lever displacement enlarging mechanism F.

The levers 108a and 108b are bisymmetrically provided, and connected to the output displacement section 117 via bisymmetrical action point hinges 106a and 106b. The output displacement section 117 is connected to a valve rod of a micro-flow rate control valve not shown.

The levers 108a and 108b are connected to top ends of the coupling posts 112a via fulcrum hinges 115a and 115b. Leading end parts 112e and 112f of the coupling posts 112a and 112b face the movable portion 110 via boundary grooves 121a and 121b. The leading end parts 112e and 112f taper to the ends, and the boundary grooves 121a and 121b diagonally incline upward to outside.

When forming the boundary grooves 121a and 121b as described above, the following advantages are available:

(1) The distance between the force point hinges 113a and 113b, on the one hand, and the fulcrum hinges 115a and 115b, on the other hand, can be reduced, thus achieving increasing the lever ratio of the levers 108a and 108b.

(2) Elongation caused by the deformation of the coupling posts 112a and 112b can be reduced.

(3) The force point hinges 113a and 113b and the fulcrum hinges 115a and 115b can be positioned closer to outer edges 112c and 112d of the coupling posts 112a and 112b, and largely apart from the action point hinges 106a and 106b in the proximity of the axis of symmetry 3C, so that the lever ratio can be improved.

Now, operations of this embodiment of the invention will be described below. When applying a voltage to the actuator element such as a piezo-electric element 101, the piezo-electric element 101 elongates in the direction of the axis of symmetry 3C in response to the applied voltage, and moves the movable portion 110 in the arrow A1 direction against the preliminary pressure.

When the movable portion 110 moves in the arrow A1 direction, a force acts in the arrow A1 direction on the action point hinges 106a and 106b of the levers 108a and 108b via the force point hinges 113a and 113b of the lever displacement enlarging mechanism F. As a result, the output displacement section 117 moves in the arrow A1 direction. At this point, the fulcrum hinges 115a and 115b and the force point hinges 113a and 113b are closer to each other and are positioned on the side of the outer edges 112c and 112d of the coupling posts 112a and 112b. The action point hinges 106a and 106b are located on the side of the axis of symmetry 3C, and all the hinges are bisymmetrical respectively. This results in a larger lever ratio, and also results in the direction of displacement in the arrow A1 direction, parallel with the axis of symmetry 3C.

The amount of displacement of the piezo-electric element 101 is largely enlarged by the law of lever and transmitted to the output displacement section 117. Because the lever displacement enlarging mechanism F is bisymmetrically arranged, the displacement is free from a rotating component, having only a component in the direction of the axis of symmetry 3C.

When the applied voltage is brought to null, the apparatus is reset to zero by the restoring force of the fulcrum, force point and action point hinges of the levers 108a and 108b. Opening of the valve is adjusted by driving the output displacement section 117 while repeating a change in voltage.

Figure 5:
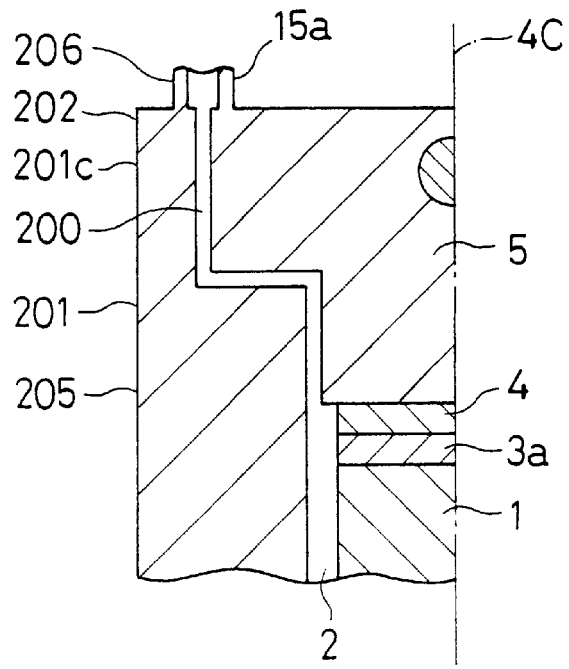
FIG. 5 is a partially cutaway sectional view of a fourth embodiment of the invention.
Figure 6:
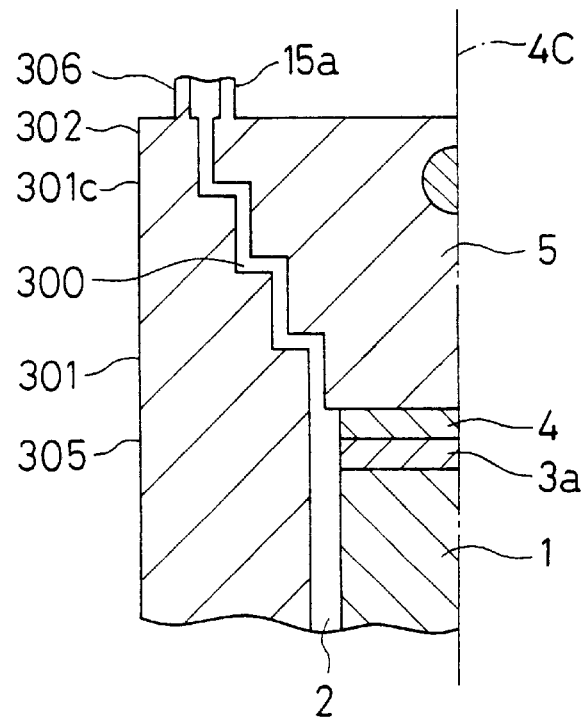
FIG. 6 is a partially cutaway sectional view of a fifth embodiment of the invention.

Application of the invention is not limited to the embodiments presented above, but covers various others, for example, the fourth embodiment shown in FIG. 5 and the fifth embodiment shown in FIG. 6, wherein a boundary groove is configurated otherwise than the inclined boundary groove. Both the FIGS. 5 and 6 correspond to FIG. 1 illustrating the first embodiment: FIG. 5 illustrates a boundary groove 200 formed into an L shape, and FIG. 6, a boundary groove 300 formed into steps. In any of these cases, leading end parts 202 and 302 of coupling posts 201 and 301 are thinner than trailing end parts 205 and 305 thereof, and force point hinges 206 and 306 and fulcrum hinge 15a are located on the side of outer edges 201c and 301c of the coupling posts 201 and 301.

By arranging fulcrums and force points close to each other and on the side of outer edges 201c and 301c of the coupling posts, and action points on the side of the axis of symmetry 4C, the distance between the fulcrums and the force points, on the other hand, and the action points, on the other hand, can be increased, and the lever ratio can be improved even without increasing the width of the apparatus. As a result, a large amount of displacement is available with a compact apparatus.

Figure 7:
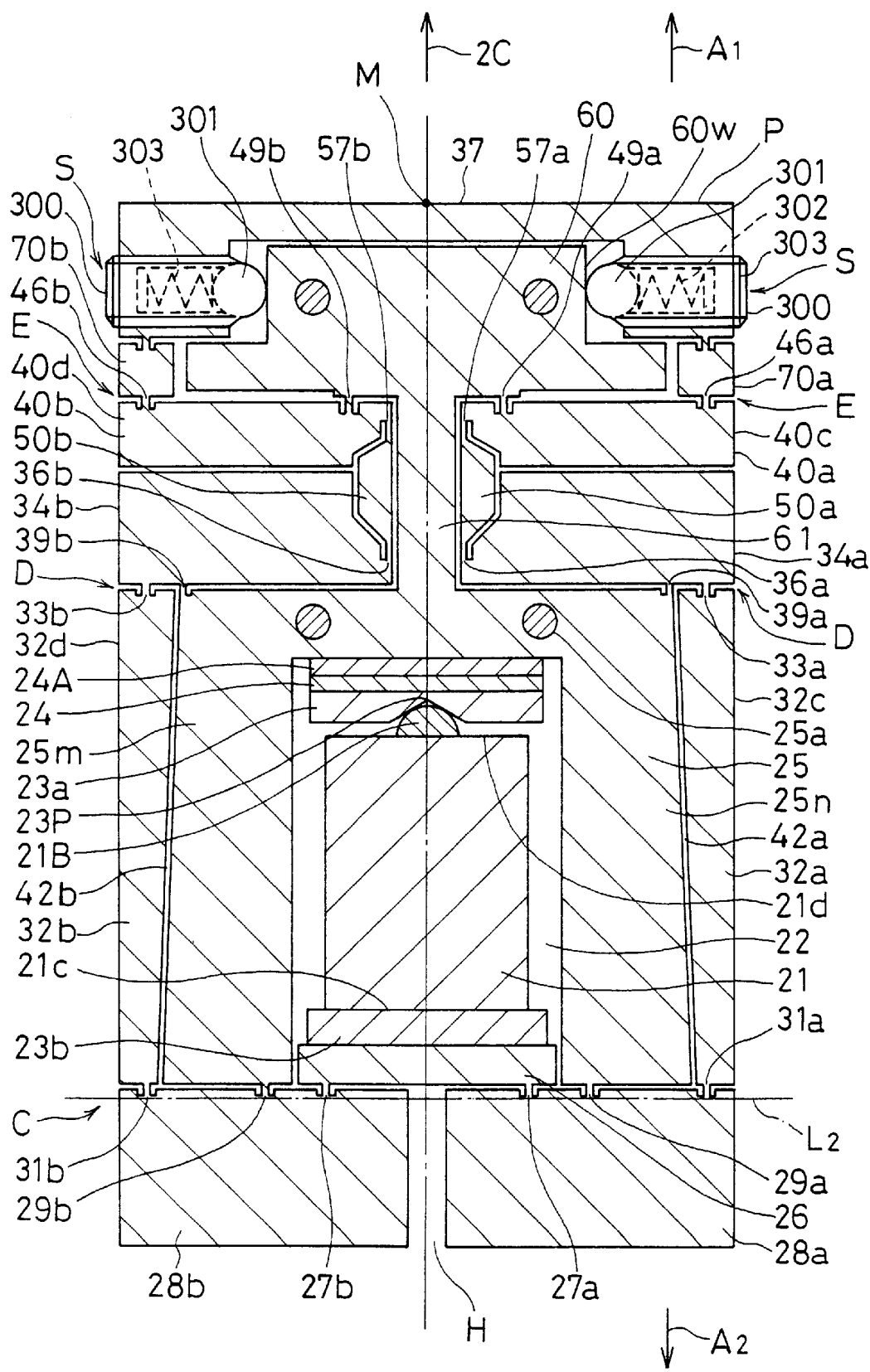
FIG. 7 is a longitudinal sectional view illustrating a sixth embodiment of the invention.

Now, a sixth embodiment of the invention will be described below with reference to FIG. 7. This embodiment has a configuration in which a straight forwarding means S is added to the three-stage lever displacement enlarging mechanism of the second embodiment (FIG. 3). A plate such as a stainless steel plate P is provided with a cut groove H formed through discharge fabrication, laser fabrication, or the like, and there are formed a housing portion 22, a fixed portion 25, bisymmetrical first levers 28a and 28b, coupling posts 32a and 32b, second levers 34a and 34b, third levers 40a and 40b, tops 50a and 50b, a block 60, coupling tops 70a and 70b, and an output displacement section 37.

An actuator element 21 is arranged in the housing portion 22, and a lower end 21c thereof is pressure-connected to a push plate 26 via a lower protecting plate 23b. The actuator element 21 is an upright actuator element displacing in the direction of the axis of symmetry 2C of the plate P, such as a piezo-electric, electrostrictive or magnetostrictive element.

The push plate 26 is connected to the bisymmetrical first levers 28a and 28b via bisymmetrical first force point hinges 27a and 27b of a first lever displacement enlarging mechanism C.

The first levers 28a and 28b are connected to lower ends of the coupling posts 32a and 32b arranged bisymmetrically via bisymmetrical action point hinges 31a and 31b.

The first levers 28a and 28b are connected to side posts 25n and 25m of the fixed portion via bisymmetrical fulcrum hinges 29a and 29b. As the fulcrums, the force points and the action points of the first levers 28a and 28b are located on a straight line L2, the direction of displacement is in the direction of the axis of symmetry 2C, and there is produced almost no rotating component.

A hemisphere 21B is fixed to a top end 21d of the actuator element 21, and the hemisphere 21B is pressure-connected to the fixed portion 25 via an upper protecting plate 23a having a receiving recess 23P with a V-shape cross-section, a wedge plate 24, and a wedge receiving plate 24A.

The wedge plate 24 imparts a preliminary pressure to the piezo-electric element and prevents a damage to the piezo-electric element. An appropriate preliminary pressure can be imparted to the piezo-electric element by adjusting the thickness and the amount of pressing of the wedge plate 24. The actuator element 21 is pressure-connected to the fixed portion 25 via a ball joint comprising the hemisphere 21B and the upper protecting plate 23a having the receiving recess 23P with a V-shaped cross-section. Therefore, even when a force is applied to the piezo-electric element in a direction different from the direction of displacement of the piezo-electric element, the applied force is absorbed under the effect of the ball joint.

An unreasonably large force therefore does not act on the piezo-electric element, thus effectuating avoidance of a breakage of the piezo-electric element.

The fixed portion 25 is fixed by a fixing screw 25a, and bisymmetrical second fulcrum hinges 39a and 39b are provided at top corners. The second fulcrum hinges 39a and 39b are connected to the second levers 34a and 34b of a bisymmetrical arranged second lever displacement enlarging mechanism D.

The second levers 34a and 34b are bisymmetrically arranged and connected to the bisymmetrical tops 50a and 50b via second action point hinges 36a and 36b. The tops 50a and 50b are formed into trapezoids.

The second levers 34a and 34b are connected to top ends of the coupling posts 32a and 32b via second force point hinges 33a and 33b. The coupling posts 32a and 32b face the side posts 25n and 25m of the fixed portion 25 via boundary grooves 42a and 42b. The coupling posts 32a and 32b are divergent toward the leading ends thereof, i.e., spreading out toward the ends. As a result, the boundary grooves 42a and 42b between the fixed portion 25 and the coupling posts 32a and 32b diagonally incline upward to inside.

The bisymmetrical second levers 34a and 34b are connected to the third levers 40a and 40b via the bisymmetrical tops 50a and 50b. The tops 50a and 50b are formed into trapezoids. One-side ends thereof are connected to the second levers 34a and 34b via the bisymmetrical action point hinges 36a and 36b, and the other ends, to the third levers 40a and 40b of a third lever displacement enlarging mechanism E via the bisymmetrical third force point hinges 57a and 57b.

In this third lever displacement enlarging mechanism E, the force points and the fulcrums are close to each other and are located on the side of the axis of symmetry 2C, and the action points are located on the side of outer edges 40c and 40d of the third levers, thus achieving improving lever ratio. The third levers 40a and 40b are connected to a block 60 via third fulcrum hinges 49a and 49b. The block 60 is connected to the fixed portion 25 via a post 61.

The third levers 40a and 40b are connected to one-side ends of bisymmetrical tops 70a and 70b via bisymmetrical third point hinges 46a and 46b. The other ends of the tops 70a and 70b are connected to the output displacement section 37 via the straight forwarding means S. The center axis of the output displacement section 37 is located on the axis of symmetry 2C, and the output displacement section 37 is connected to a valve rod or the like of a micro-flow rate control valve not shown.

The straight forwarding means S gives a displacement direction correcting force to the hinges of the levers. It adjusts the displacement force of the actuator element 21 enlarged via the lever displacement enlarging mechanisms C, D and E to a displacing force in a direction in parallel with the axis of symmetry 2C, and causes the output displacement section 37 to go straight ahead, i.e., to move while always positioning the center axis of the output displacement section 37 on the axis of symmetry 2C.

For example, a ball plunger 300 is used as the straight forwarding means S. The straight forwarding means S comprises a ball 301 pressure-connected to a side wall 60W of the block 60 and a screw 303 having a built-in spring 302 for pressing the ball 301.

Now, operations of this embodiment will be described below.

First, the straight forwarding means S is adjusted. A mirror not shown is placed at the center portion M of the output displacement section 37, and while irradiating a light beam in a direction perpendicular to the axis of symmetry 2C onto the mirror, the mirror angle is adjusted so that the reflected beam is in parallel with the axis of symmetry 2C.

Thereafter, the actuator element 21 is made to drive while continuing irradiation, adjusting of right and left pressing force is done by rotating the right and left ball plungers so as to always keep the reflected beam to be in pararell with the axis of symmetry, to effectuate applying a displacing direction correcting force of the levers of the lever displacement enlarging mechanisms C, D and E.

When a voltage is applied to the actuator element such as a piezo-electric element 21, the piezoelectric element 21 elongates in the direction of the axis of symmetry 2C in response to the applied voltage against the preliminary pressure, thus causing the push plate 26 to move in the A2 direction.

When the push plate 26 moves in the arrow A2 direction, a force in the arrow A2 direction acts on the first levers 28a and 28b via the force point hinges 27a and 27b of the first lever displacement enlarging mechanism C. As a result, the levers 28a and 28b cause the coupling posts 32a and 32b to move in the arrow A1 direction via the action point hinges 31a and 31b.

Since movement of the coupling posts 32a and 32b pushes the second force point hinges 33a and 33b of the second levers 34a and 34b in the arrow A1 direction, the action point hinges 36a and 36b of the second levers 34a and 34b move in the arrow A2 direction. As a result, the tops 50a and 50b move in the arrow A2 direction.

At this point, the force points and the fulcrums of the second lever displacement enlarging mechanism D are close to each other and are located closer to the side of the outer edges 32c and 32d of the coupling posts 32a and 32b. The action points are located closer to the axis of symmetry 2C. Because all these points are bisymmetrical, there is available a large lever ratio, and a large amount of displacement can be obtained in the direction of the axis of symmetry 2C, i.e., in the arrow A2 direction.

Presence of the tops 50a and 50b reduces the resistance of the hinges, enabling higher transmitting efficiency.

Because the displacement of the tops 50a and 50b in the arrow A2 direction pulls the third force point hinges 57a and 57b of the third levers 40a and 40b in the arrow A2 direction, the third action point hinges 46a and 46b of the third lever displacement enlarging mechanism E cause the output displacement section 37 to move in the arrow A1 direction via the coupling tops 70a and 70b.

At this point, the output displacement section 37, being previously adjusted so as to go straight ahead by the straight forwarding means S, moves so that the center axis of the output displacement section 37 is always on the axis of symmetry 2C.

The coupling tops 70a and 70b serve to reduce the resistance of the hinges and improve the transmitting efficiency.

The amount of displacement of the piezo-electric element 21 is largely enlarged by the law of lever and transmitted to the output displacement section 37. Because the lever displacement enlarging mechanisms C, D and E are bisymmetrically arranged, the displacement is free from a rotating component, having only a component in the direction of the axis of symmetry 2C.

When the applied voltage is brought to null, the apparatus is reset to zero by restoring force of the fulcrum, force point and action point hinges of the first levers 28a and 28b, the second levers 34a and 34b, and the third levers 40a and 40b.

Opening of the valve is adjusted by driving the output displacement section 37 while repeating a change in voltage.

Figure 8:
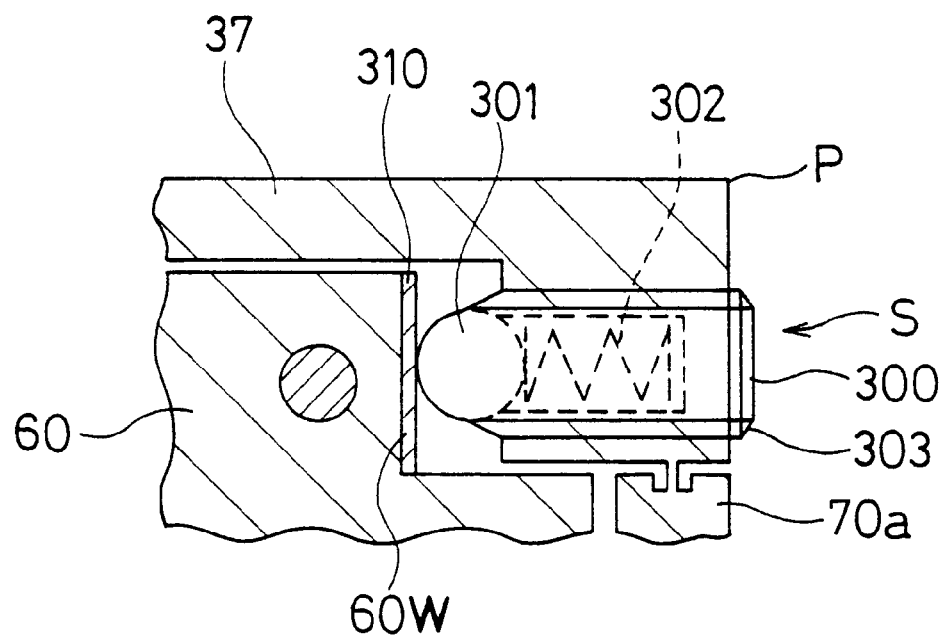
FIG. 8 is a partially cutaway enlarged sectional view illustrating a seventh embodiment of the invention.

Now, a seventh embodiment of the invention will be described below with reference to FIG. 8. This embodiment differs from the sixth embodiment (FIG. 7) in that a smooth flat plate 310 is secured to the side wall 60W of the block 60, and the ball 301 of the ball plunger 300 is brought into contact with the flat plate 310. By so doing, even when irregularities occur on the side wall 60W as a result of discharge fabrication or the like, the surface in contact with the ball 301 is smooth, and no adverse effect is exerted on the rotation of the ball 301.

There is no particular limitation on the material for the flat plate 301. By way of example, a metal plate or a resin plate is also applicable.

Figure 9:
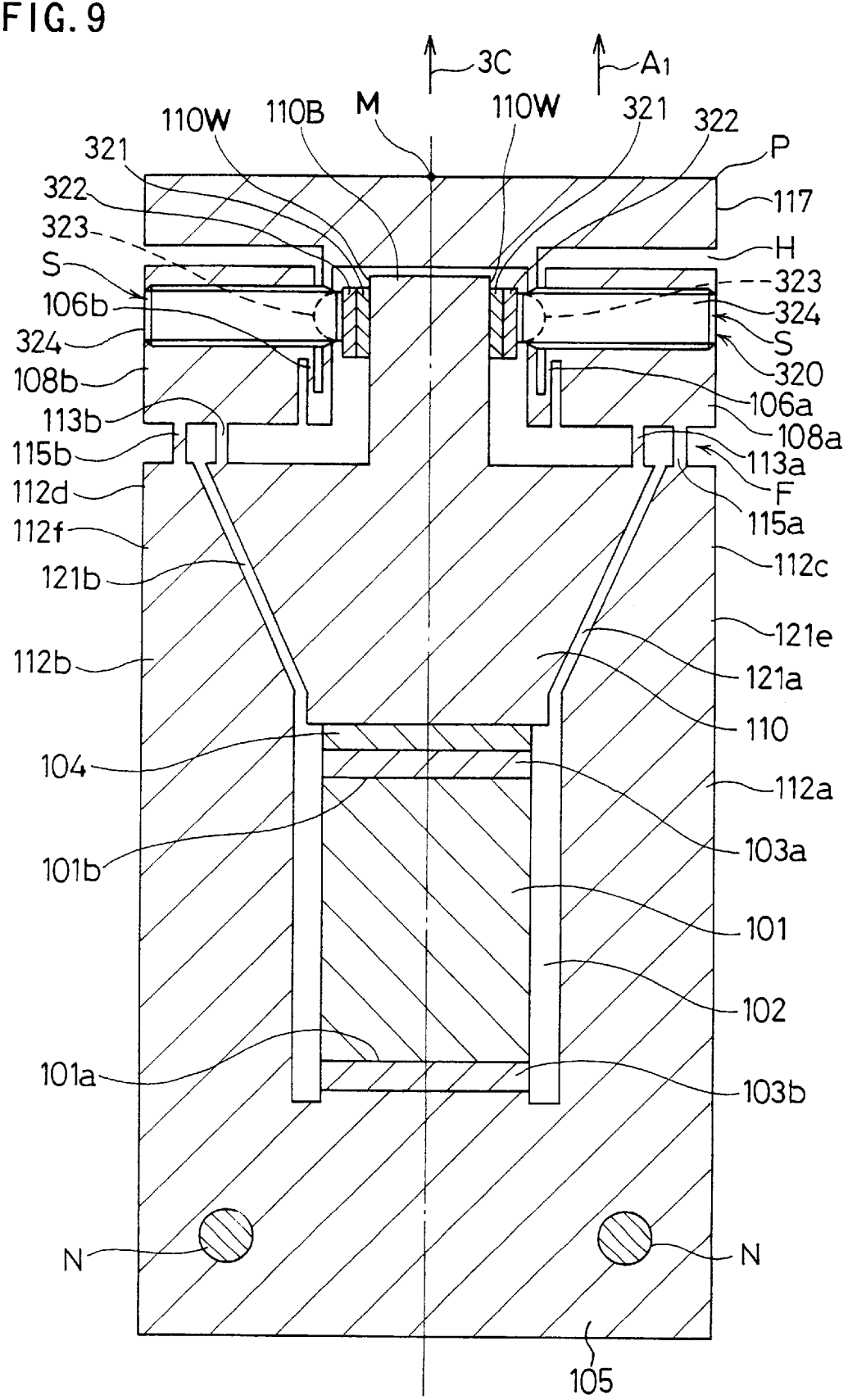
FIG. 9 is a longitudinal sectional view illustrating an eighth embodiment of the invention.
Figure 10:
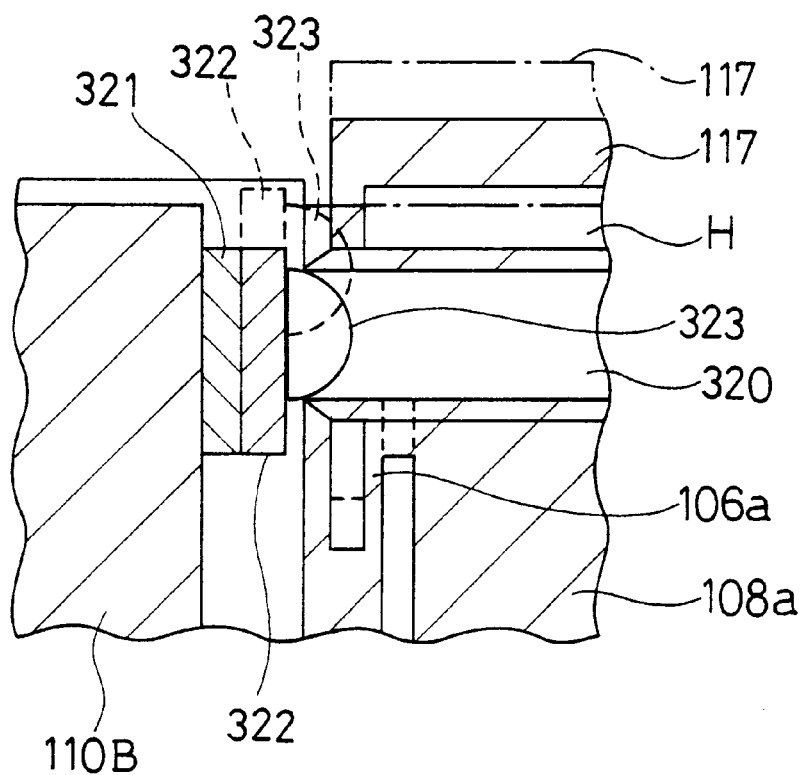
FIG. 10 is a partially cutaway enlarged sectional view illustrating another state of FIG. 9.

An eighth embodiment will now be described below with reference to FIGS. 9 and 10. This embodiment has a configuration in which a straight forwarding correcting means S is added to the one-stage lever displacement enlarging mechanism of the third embodiment (FIG. 4).

A rectangular plate such as a stainless steel plate P is provided with a cut groove H formed through discharge fabrication, laser fabrication, or the like, and there are formed a housing portion 102, a screw-tightened fixed portion 105, bisymmetrical levers 108a and 108b, a movable portion 110, bisymmetrical coupling posts 112a and 112b, and an output displacement section 117.

An actuator element 101 is arranged in the housing portion 102, and a lower end 101a thereof is pressure-connected to the fixed portion 105 via a lower protecting plate 103b.

The actuator element 101 is an upright actuator element displacing in the direction of the axis of symmetry 3C of the plate P, such as a piezo-electric, electrostrictive or magnetostrictive element.

A top end 101b of the actuator element 101 is pressure-connected to the movable portion 110 via an upper protecting plate 103a and a wedge plate 104.

The wedge plate 104 imparts a preliminary pressure to the piezo-electric element and prevents a damage to the piezo-electric element. An appropriate preliminary pressure is imparted to the piezo-electric element by adjusting the thickness and the amount of pressing of the wedge plate 104.

The movable portion 110 is formed into an inverted trapezoid, and bisymmetrical force point hinges 113a and 113b are provided at the top corners thereof. The force point hinges 113a and 113b are connected to bisymmetrically arranged levers 108a and 108b of a lever displacement enlarging mechanism F.

The levers 108a and 108b are bisymmetrically arranged, and connected to an output displacement section 117 via bisymmetrical action point hinges 106a and 106b and straight forward correcting means S. The center axis of the output displacement section is located on the axis of symmetry 3C, and output displacement section 117 is connected to a valve rod or the like of a micro-flow rate control valve not shown.

The straight forward correcting means S gives a displacement direction correcting force to the hinges of the levers. It adjusts the displacing force of the actuator element 101 enlarged via the lever displacement enlarging mechanism F to a displacing force in a direction in parallel with the axis of symmetry 3C, and cause the output displacement section 117 to go straight ahead, i.e., to move while always positioning the center axis of the output displacement section 117 on the axis of symmetry 3C.

For example, a clamping screw 320 is used as the straight forward correcting means S. The straight forward correcting means S comprises a flat plate 321 of a central projection 110B of the movable portion 110, a sliding plate 322 provided slidably relative to the flat plate 321, a hemisphere 323 fixed to the sliding plate 322, and a screw 324 in surface contact with the hemisphere 323. The flat plate 321 may be omitted.

The flat plate 321 and the sliding plate 322 are formed of smooth plates, and made of such a material as will allow each other's smooth sliding, for example, a metal plate, a resin plate, or the like.

The levers 108a and 108b are connected to top ends of the coupling posts 112a and 112b via fulcrum hinges 115a and 115b. Leading ends 112e and 112f of the coupling posts 112a and 112b face the movable portion 110 via boundary grooves 121a and 121b. The leading ends 112e and 112f taper toward the ends, and the boundary grooves 121a and 121b diagonally incline upward to outside.

Forming the boundary grooves 121a and 121b as described above provides the following advantages:

(1) The distance between the force point hinges 113a and 113b, on the one hand, and the fulcrum hinges 115a and 115b, on the other hand, can be reduced, thus leading to an increased lever ratio of the levers 108a and 108b.

(2) Elongation caused by deformation of the coupling posts 112a and 112b can be reduced.

(3) The force point hinges 113a and 113b and the fulcrum hinges 115a and 115b are located closer to outer edges 112c and 112d of the coupling posts 112a and 112b, and largely apart from the action point hinges 106a and 106b closer to the axis of symmetry 3C. It is thus available to increase the lever ratio.

Operations of this embodiment will now be described below.

First, the straight forward correcting means S is adjusted. A mirror is arranged at a center portion M of the output displacement section 117. While irradiating a light beam in an direction perpendicular to the axis of symmetry 3C onto the mirror, the mirror angle is adjusted so that the reflected beam is in parallel with the axis of symmetry 3C. Then, the actuator element 101 is driven while continuing irradiation, and the clamping screw 320 is turned so as to keep always the reflected beam in parallel with the axis of symmetry 3C, to apply a displacement direction correcting force to the lever hinges of the lever displacement enlarging mechanism F.

When a voltage is applied to the actuator element, for example, the piezo-electric element 101, the piezo-electric element 101 elongates in the direction of the axis of symmetry 3C in response to the applied voltage, thus causing the movable portion 110 to move in the arrow A1 direction against the preliminary pressure.

When the movable portion 110 moves in the arrow A1 direction, a force in the arrow A1 direction acts on the action point hinges 106a and 106b of the levers 108a and 108b via the force point hinges 106a and 106b of the lever displacement enlarging mechanism F. As a result, the output displacement section 117 moves in the arrow A1 direction. At this point, the fulcrum hinges 115a and 115b and the force point hinges 113a and 113b are close to each other and are located on the side of the outer edges 112c and 112d of the coupling posts 112a and 112b, and the action point hinges 106a and 106b are located on the side of the axis of symmetry 3C. Thus, because all the hinges are symmetrical, the lever ratio is improved, and the direction of displacement agrees with the arrow A1 direction in parallel with the axis of symmetry 3C.

At this point, the sliding plate 322 slides on the surface of the flat plate 321 in parallel with the axis of symmetry 3C, thus causing the output displacement section 117 to go straight ahead. In other words, since the direction of displacement is regulated by the straight forward correcting means S, the output displacement section 117 goes straight ahead while always positioning the center axis thereof on the axis of symmetry 3C.

The amount of displacement of the piezo-electric element 101 is largely enlarged by the law of lever, and transmitted to the output displacement section 117. Since the lever displacement enlarging mechanism F is bisymmetrically arranged with bisymmetrical hinges, the displacement contains no rotating component, containing only the component in the direction of the axis of symmetry 3C.

Now, when the applied voltage is brought to null, the apparatus is reset to zero by the restoring force of the fulcrum, force point and action point hinges of the levers 108a and 108b.

Opening of the valve is adjusted by driving the output displacement section 117 while repeating a change in voltage.

Figure 11:
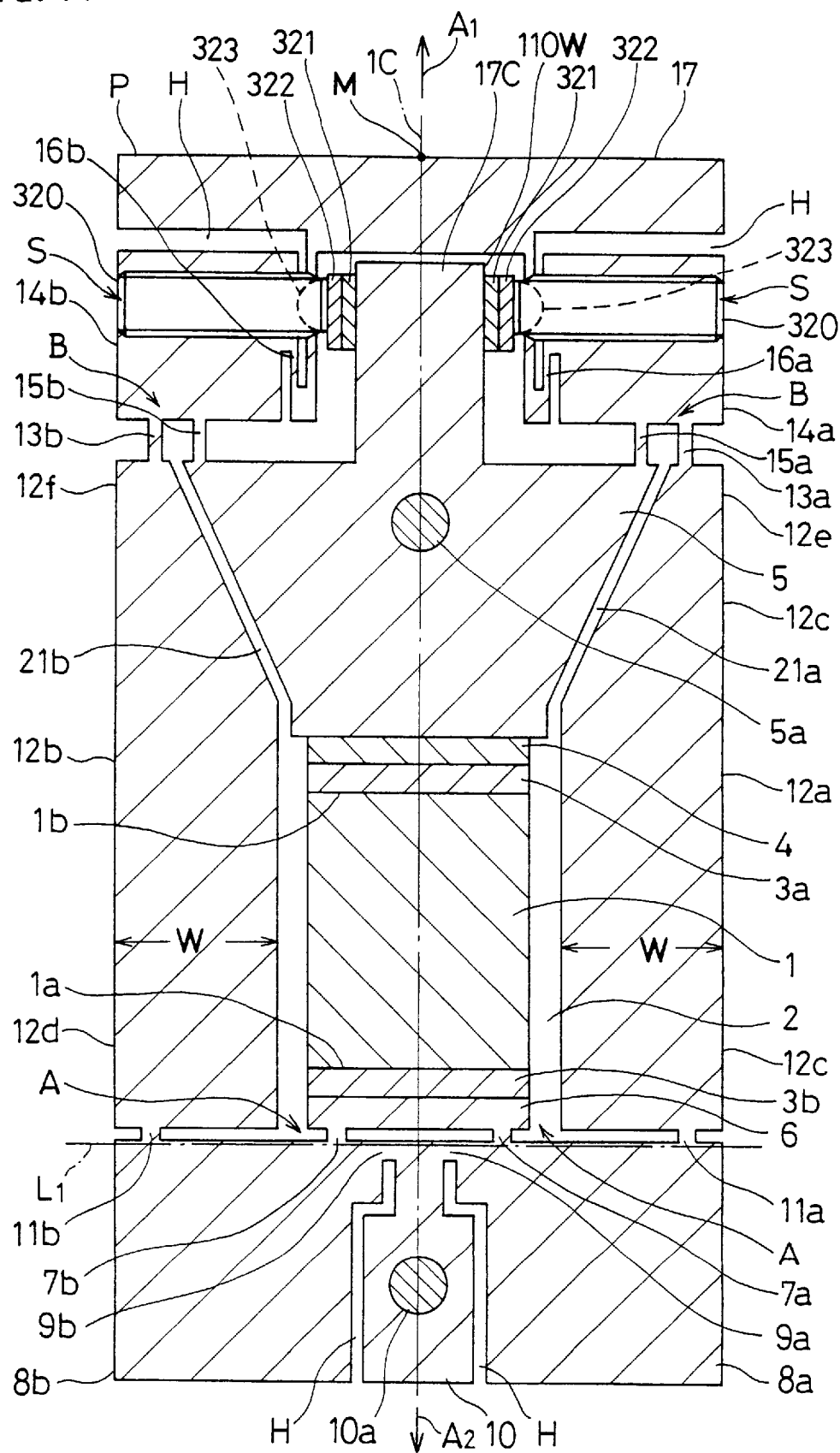
FIG. 11 is a longitudinal sectional view illustrating a ninth embodiment of the invention.

Now, a ninth embodiment will be described below with reference to FIG. 11. This embodiment has a configuration in which the straight forward correcting means S described in the eighth embodiment (FIGS. 9 and 10) is added to the two-stage lever displacement enlarging mechanism of the first embodiment (FIGS. 1 and 2).

A rectangular plate such as a stainless steel plate P is provided with a cut groove H formed through discharge fabrication, laser fabrication, or the like, and there are formed a housing portion 2, an upper fixed portion 5, bisymmetrical first levers 8a and 8b, a lower fixed portion 10, bisymmetrical coupling posts 12a and 12b, bisymmetrical second levers 14a and 14b, and an output displacement section 17.

An actuator element 1 is arranged in the housing portion 2, and a lower end 1a is pressure-connected to a push plate 6 via a lower protecting plate 3b. The actuator element 1 is an upright actuator element displacing in the direction of the axis of symmetry 1C of the plate P, such as a piezo-electric, electrostrictive or magnetostrictive element.

The push plate 6 is connected to the bisymmetrical first levers 8a and 8b via bisymmetrically arranged force point hinges 7a and 7b of a first lever displacement enlarging mechanism A.

The first levers 8a and 8b are connected to lower ends of the coupling posts 12a and 12b bisymmetrically arranged via bisymmetrical action point hinges 11a and 11b. The action point hinges 11a and 11b are located closer to outer edges 12c and 12d of the coupling posts 12a and 12b.

The first levers 8a and 8b are connected to the lower fixed portion 10 via bisymmetrical fulcrum hinges 9a and 9b. The fulcrum hinges 9a and 9b are located closer to the axis of symmetry 1C, and connected sideways to the lower fixed portion 10, leading to a small distance between fulcrums and force points. As a result, it is available to increase the lever ratio of the first levers 8a and 8b, and to downsize the apparatus as a whole. Because the fulcrums, the force points and the action points of the first levers 8a and 8b are on a straight line L1, the direction of displacement is in the direction of the axis of symmetry 1C, and almost no rotating component is produced.

A top end 1b of the actuator element 1 is pressure-connected to the upper fixed portion 5 via an upper protecting plate 3a and a wedge plate 4. The wedge plate 4 imparts a preliminary pressure to the piezo-electric element, and prevents a damage to the piezo-electric element upon imparting the preliminary pressure. An appropriate preliminary pressure can be imparted to the piezo-electric element by adjusting the thickness and the amount of pressing of the wedge plate 4.

The upper fixed plate 5 is formed into an inverted trapezoid, and bisymmetrical upper fulcrum hinges 15a and 15b are provided at top corners. The upper fulcrum hinges 15a and 15b are connected to the bisymmetrically arranged second levers 14a and 14b of a second lever displacement enlarging mechanism B.

The second levers 14a and 14b are bisymmetrically arranged, and connected to the output displacement section 17 via bisymmetrical action point hinges 16a and 16b. The center axis of the output displacement section 17 is located on the axis of symmetry 1C, and the output displacement section 17 is connected to a valve rod or the like of a micro-flow rate control valve not shown.

The straight forward correcting means S imparts a displacement direction correcting force to the hinges of the levers. It adjusts the displacing force of the actuator element 101 enlarged via the lever displacement enlarging mechanism to a displacing force in a direction in parallel with the axis of symmetry 3C, and causes the output displacement section 17 to go straight ahead, i.e., to move while always positioning the center axis of the output displacement 17 on the axis of symmetry 1C.

For example, a clamping screw 320 is used as the straight forward correcting means S. The clamping screw 320 comprises a flat plate 321 of a center projection 17C, a sliding plate 322 provided slidably along the flat plate 321, a hemisphere 323 fixed to the sliding plate 322, and a screw 324 in surface contact with the hemisphere 323.

The flat plate 321 and the sliding plate 322 are formed with smooth plates, and made of a material allowing smooth mutual sliding, for example, a metal plate, a resin plate and the like.

The second levers 14a and 14b are connected to top ends of the coupling posts 12a and 12b via second force point hinges 13a and 13b. Leading end parts 12e and 12f of the coupling posts 12a and 12b face the upper fixed portion 5 via boundary grooves 21a and 21b. The leading end parts 12e and 12f taper to the tips, and the boundary grooves 21a and 21b diagonally incline upward to outside.

Forming the boundary grooves 21a and 21b as described above brings about the following advantages:

(1) The distance between the second force point hinges 13a and 13b, on the one hand, and the second fulcrum hinges 15a and 15b, on the other hand, can be reduced, thus leading to a larger lever ratio of the second levers 14a and 14b.

(2) Elongation caused by deformation of the coupling posts 12a and 12b can be reduced.

(3) The second force point hinges 13a and 13b, and the second fulcrum hinges 15a and 15b are located closer to the outer edges 12c and 12d of the coupling posts 12a and 12b, and largely apart from the action point hinges 16a and 16b close to the axis of symmetry C. It is therefore available to improve lever ratio.

Now, operations of this embodiment will be described below.

First, the straight forward correcting means S is adjusted. A mirror not shown is placed at a center portion M of the output displacement section 17, and while irradiating a light beam in a direction perpendicular to the axis of symmetry 1C onto the mirror, the mirror angle is adjusted so that the reflected beam is in parallel with the axis of symmetry 1C.

Then, the subsequent steps comprise driving the actuator element 1 while continuing irradiation, and applying a displacement direction correcting force to the lever hinges of the lever displacement enlarging mechanisms A and B by rotating the clamping screw 320 so as to keep parallelism of the reflected beam with the axis of symmetry 1C.

When a voltage is applied to an actuator element such as a piezo-electric element 1, the piezo-electric element 1 elongates in the direction of the axis of symmetry 1C in response to the applied voltage, and cause the push plate 6 to move in the arrow A2 direction against the preliminary pressure.

When the push plate 6 moves in the arrow A2 direction, a force acts in the arrow A2 direction on the first levers 8a and 8b via the force point hinges 7a and 7b of the first lever displacement enlarging mechanism A. As a result, the levers 8a and 8b cause the coupling posts 12a and 12b to move in the arrow A2 direction via the action point hinges 11a and 11b.

Since movement of the coupling posts 12a and 12b pulls the second force point hinges 13a and 13b of the second levers 14a and 14b in the arrow A2 direction, the output displacement section 17 displaces in the arrow A1 direction via the second action point hinges 16a and 16b.

At this point, because the output displacement section 17 has previously been adjusted by the straight forward correcting means S so at to go straight ahead, it goes straight ahead while always positioning the center axis thereof on the axis of symmetry 1C.

The amount of displacement of the piezo-electric element 1 is largely enlarged by the law of lever and transmitted to the output displacement section 17. Because the lever displacement enlarging mechanisms A and B are bisymmetrically arranged, the displacement contains no rotating component, containing only the component in the direction of the axis of symmetry 1C.

The law of lever is exerted while the second fulcrum hinges 15a and 15b and the second force point hinges 13a and 13b of the second lever displacement enlarging mechanism B move in directions counter to each other, thus attaining considerable enlarging of the amount of displacement.

When the applied voltage is brought to null, the apparatus is reset to zero by the restoring force of the respective fulcrum, force point and action point hinges of the first levers 8a and 8b and the second levers 14a and 14b. Opening of the valve is adjusted by driving the output displacement section 17 while repeating a change in voltage as described above.

Figure 12:
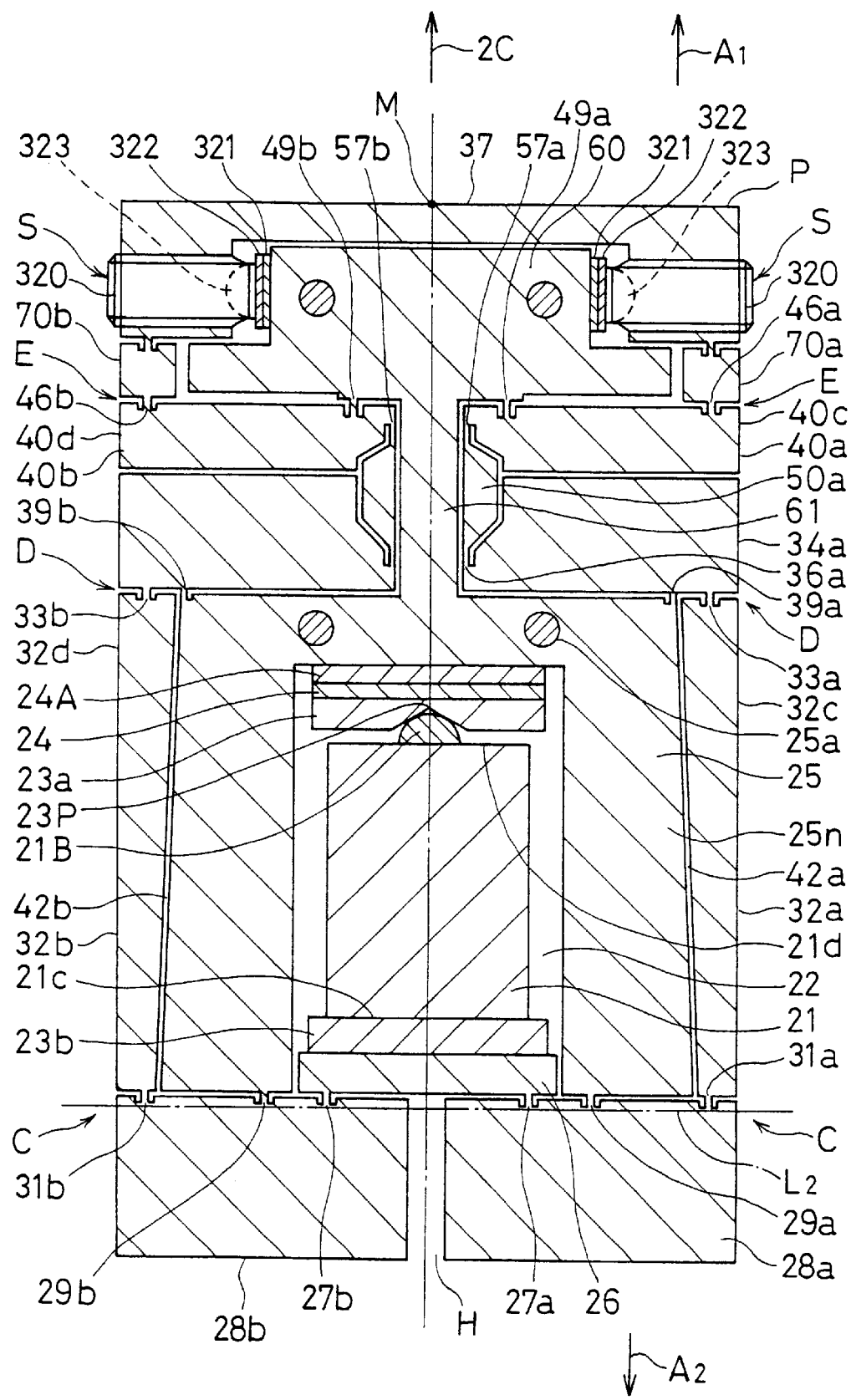
FIG. 12 is a longitudinal sectional view of a tenth embodiment of the invention, corresponding to FIG. 7.

Now, a tenth embodiment of the invention is illustrated in FIG. 12. This embodiment covers a configuration in which, in the three-stage lever displacement enlarging mechanism of the sixth embodiment (FIG. 7), the ball plunger 300 as a straight forward correcting means S is replaced by a clamping screw 320 of the eighth embodiment (FIG. 9). This embodiment, corresponding to the sixth and eighth embodiments, will not be described here to avoid duplication. In FIG. 12, the same reference numerals as those in FIGS. 7 and 9 have the same names and the same functions.

Industrial Applicability

The lever displacement enlarging mechanism of the invention is applicable, for example, for a positioning apparatus of an optical stage and a micro-flow rate control valve (mass-flow controller). It is suitable particularly in an apparatus which cannot have a large space for a housing portion of the displacement enlarging mechanism in design, and yet is required to give a prescribed displacement enlarging ratio, or an apparatus required to provide a particularly strict straight forwarding property.

What is claimed is:

1. A lever displacement enlarging mechanism comprising a fixed portion and a movable portion holding both ends of an actuator element in between in a direction of displacement; bisymmetrical coupling posts connectively disposed on both sides of said fixed portion, and having respectively a leading end part thereof facing said movable portion via a boundary groove; bisymmetrical fulcrum hinges connecting respectively a leading end of said respective coupling posts and a lever; bisymmetrical force point hinges connecting respectively a leading end of said movable portion and said lever; and bisymmetrical action point hinges connecting respectively said lever and an output displacement section; wherein:

the distance between the leading end side of said boundary groove and an outer edge of said respective coupling posts is made smaller than the distance between the trailing end side thereof and said outer edge so that said fulcrum hinges and said force point hinges are closer to said outer edge of said connecting posts, and said action point hinges are positioned closer to an axis of symmetry.

2. A lever displacement enlarging mechanism comprising an upper fixed portion and a push plate holding both ends of an actuator element in between in a direction of displacement; bisymmetrical first force point hinges connecting said push plate and first levers; bisymmetrical first fulcrum hinges connecting said first levers and a lower fixed portion; bisymmetrical coupling posts connectively disposed on both sides of said first levers via first action point hinges, and having respectively a leading end part facing said upper fixed portion via a boundary groove; bisymmetrical second force point hinges connecting leading ends of said coupling posts and second levers; bisymmetrical second fulcrum hinges connecting leading ends of said upper fixed portion and said second levers; and bisymmetrical second action point hinges connecting said second levers and an output displacement section; wherein:

action points, force points and fulcrums of said first levers are positioned on a straight line; and the distance between the leading end side of said boundary groove and an outer edge of said coupling posts is made smaller than the distance between the trailing end side thereof and said outer edge so that said second fulcrum hinges and said second force point hinges are closer to the outer edges of said coupling posts, and said second action point hinges are positioned closer to an axis of symmetry.

3. A lever displacement enlarging mechanism comprising a fixed portion and a push plate holding both ends of an actuator element in between in a direction of displacement; bisymmetrical first force point hinges connecting said push plate and first levers; bisymmetrical first fulcrum hinges connecting leading ends of side posts of said fixed portion and said first levers; bisymmetrical coupling posts which are connectively disposed on both sides of said first levers via first action point hinges and face said side posts via boundary grooves; bisymmetrical second fulcrum hinges connecting said fixed portion and said second levers; bisymmetrical second force point hinges connecting said coupling posts and said second levers; bisymmetrical second action point hinges connecting said second levers and tops; bisymmetrical third force point hinges connecting said tops and third levers; bisymmetrical third fulcrum hinges connecting said third levers and a block; and bisymmetrical third action point hinges connecting said third levers and an output displacement section; wherein:

action points, force points and fulcrums of said first levers are positioned on a straight line; and the distance between the leading end sides of said boundary grooves and outer edges of said connecting posts is made smaller than the distance between the trailing end sides and said outer edges so that said second fulcrum hinges and the second force point hinges are closer to the outer edges of said coupling posts, and said second action point hinges are positioned closer to an axis of symmetry.

4. A lever displacement enlarging mechanism comprising a fixed portion and a movable portion holding both ends of an actuator element in between in a direction of displacement; bisymmetrical coupling posts connectively disposed on both sides of said fixed portion, and having respectively a leading end part thereof facing said movable portion via a boundary groove; bisymmetrical fulcrum hinges connecting respectively a leading end of said respective coupling posts and a lever; bisymmetrical force point hinges connecting respectively a leading end of said movable portion and said lever; and bisymmetrical action point hinges connecting respectively said lever and an output displacement section; wherein:

a wedge for adjusting a preliminary pressure is provided between said fixed portion and said actuator element.

5. A lever displacement enlarging mechanism comprising an upper fixed portion and a push plate holding both ends of an actuator element in between in a direction of displacement; bisymmetrical first force point hinges connecting said push plate and first levers; bisymmetrical first fulcrum hinges connecting said first levers and a lower fixed portion; bisymmetrical coupling posts connectively disposed on both sides of said first levers via first action point hinges, and having respectively a leading end part facing said upper fixed portion via a boundary groove; bisymmetrical second force point hinges connecting leading ends of said coupling posts and second levers; bisymmetrical second fulcrum hinges connecting leading ends of said upper fixed portion and said second levers; and bisymmetrical second action point hinges connecting said second levers and an output displacement section; wherein:

a wedge for adjusting a preliminary pressure is provided between said upper fixed portion and said actuator element.

6. A lever displacement enlarging mechanism comprising a fixed portion and a push plate holding both ends of an actuator element in between in a direction of displacement; bisymmetrical first force point hinges connecting said push plate and first levers; bisymmetrical first fulcrum hinges connecting leading ends of side posts of said fixed portion and said first levers; bisymmetrical coupling posts which are connectively disposed on both sides of said first levers via first action point hinges and face said side posts via boundary grooves; bisymmetrical second fulcrum hinges connecting said fixed portion and said second levers; bisymmetrical second force point hinges connecting said coupling posts and said second levers; bisymmetrical second action point hinges connecting said second levers and tops; bisymmetrical third force point hinges connecting said tops and third levers; bisymmetrical third fulcrum hinges connecting said third levers and a block; and bisymmetrical third action point hinges connecting said third levers and an output displacement section; wherein:

a wedge for adjusting a preliminary pressure is provided between said fixed portion and said actuator element.

7. A lever displacement enlarging mechanism according to any one of claims 1 to 3, wherein a wedge for adjusting a preliminary pressure is provided between said fixed portion and said actuator element.

8. A lever displacement enlarging mechanism according to any one of claims 4 to 6, wherein a protecting plate is provided between said wedge and said actuator element.

9. A lever displacement enlarging mechanism according to any one of claims 1 to 6, wherein said boundary grooves incline relative to the axis of symmetry.

10. A lever displacement enlarging mechanism according to any one of claims 1 to 6, wherein said boundary grooves are formed stepwise.

11. A lever displacement enlarging mechanism according to claim 3 or 6, wherein said third levers and said output displacement section are connected to each other via tops arranged bisymmetrically.

12. A lever displacement enlarging mechanism comprising a fixed portion and a movable portion holding both ends of an actuator element in between in a direction of displacement; bisymmetrical coupling posts connectively disposed on both sides of said fixed portion, and having respectively a leading end part thereof facing said movable portion via a boundary groove; bisymmetrical fulcrum hinges connecting respectively a leading end of said respective coupling posts and a lever; bisymmetrical force point hinges connecting respectively a leading end of said movable portion and said lever; and bisymmetrical action point hinges connecting respectively said lever and an output displacement section; wherein:

there is provided straight forward correcting means for imparting a displacement direction correcting force to the hinges of said lever.

13. A lever displacement enlarging mechanism comprising an upper fixed portion and a push plate holding both ends of an actuator element in between in a direction of displacement; bisymmetrical first force point hinges connecting said push plate and first levers; bisymmetrical first fulcrum hinges connecting said first levers and a lower fixed portion; bisymmetrical coupling posts connectively disposed on both sides of said first levers via first action point hinges, and having respectively a leading end part facing said upper fixed portion via a boundary groove; bisymmetrical second force point hinges connecting leading ends of said coupling posts and second levers; bisymmetrical second fulcrum hinges connecting leading ends of said upper fixed portion and said second levers; and bisymmetrical second action point hinges connecting said second levers and an output displacement section; wherein:

there is provided straight forward correcting means for imparting a displacement direction correcting force to the hinges of said levers.

14. A lever displacement enlarging mechanism comprising a fixed portion and a push plate holding both ends of an actuator element in between in a direction of displacement; bisymmetrical first force point hinges connecting said push plate and first levers; bisymmetrical first fulcrum hinges connecting leading ends of side posts of said fixed portion and said first levers; bisymmetrical coupling posts which are connectively disposed on both sides of said first levers via first action point hinges and face said side posts via boundary grooves; bisymmetrical second fulcrum hinges connecting said fixed portion and said second levers; bisymmetrical second force point hinges connecting said coupling posts and said second levers; bisymmetrical second action point hinges connecting said second levers and tops; bisymmetrical third force point hinges connecting said tops and third levers; bisymmetrical third fulcrum hinges connecting said third levers and a block; and bisymmetrical third action point hinges connecting said third levers and an output displacement section; wherein:

there is provided straight forward correcting means for imparting a displacement direction correcting force to the hinges of said levers.

15. A lever displacement enlarging mechanism according to any one of claims 1 to 6, wherein:

there is provided straight forward correcting means for imparting a displacement direction correcting force to the hinges of said levers.

16. A lever displacement enlarging mechanism according to any one of claims 12 to 15, wherein said straight forward correcting means is provided with ball plungers arranged symmetrically on the right and left levers.

17. A lever displacement enlarging mechanism according to any one of claims 12 to 15, wherein said straight forward correcting means is provided with clamping screws arranged bisymmetrically on the right and left levers.

18. A lever displacement enlarging mechanism according to any one of claims 12 to 14, wherein said boundary groove inclines relative to the axis of symmetry.

19. A lever displacement enlarging mechanism according to any one of claims 12 to 14, wherein said boundary groove is formed stepwise.

* * * * *